(12) United States Patent
Elliott et al.

(10) Patent No.: US 7,556,229 B2
(45) Date of Patent: Jul. 7, 2009

(54) CLAMP

(75) Inventors: Joe Elliott, Mequon, WI (US); Frank Scott, Milwaukee, WI (US)

(73) Assignee: Master Lock Company LLC, Oak Creek, WI (US)

( * ) Notice: Subject to any disclaimer, the term of this patent is extended or adjusted under 35 U.S.C. 154(b) by 112 days.

(21) Appl. No.: 11/455,437

(22) Filed: Jun. 19, 2006

(65) Prior Publication Data

US 2007/0012834 A1  Jan. 18, 2007

Related U.S. Application Data

(60) Provisional application No. 60/691,922, filed on Jun. 17, 2005.

(51) Int. Cl.
*A47B 96/06* (2006.01)
*E04G 3/00* (2006.01)
*B60R 9/00* (2006.01)

(52) U.S. Cl. ............ 248/230.1; 248/230.9; 248/292.12; 224/536

(58) Field of Classification Search .............. 248/230.1, 248/230.9, 231.85, 222.14, 229.1, 292.12, 248/292.13; 224/519, 520, 521, 535, 536, 224/502, 504, 506, 523, 497; 403/374.1

See application file for complete search history.

(56) References Cited

U.S. PATENT DOCUMENTS

| 4,676,413 A | | 6/1987 | Began et al. |
| 4,718,151 A | * | 1/1988 | LeVahn et al. ................ 24/535 |
| 5,275,391 A | * | 1/1994 | Lynn et al. .................... 269/93 |
| 5,303,857 A | * | 4/1994 | Hewson ....................... 224/536 |
| 5,685,686 A | * | 11/1997 | Burns ........................... 224/521 |

(Continued)

FOREIGN PATENT DOCUMENTS

GB  744064  2/1956

OTHER PUBLICATIONS

International Search Report and Written Opinion from PCT International Appln. No. PCT/US06/23739 dated Aug. 8, 2007, 10 pages.

*Primary Examiner*—Amy J. Sterling
*Assistant Examiner*—Tan Le
(74) *Attorney, Agent, or Firm*—Calfee, Halter & Griswold LLP

(57) ABSTRACT

A clamp for securing an item includes a locking rod, first and second clamping members, and a retainer. The locking rod includes an elongated body and a locking member connected to a first end of the elongated body. The locking member is movable between a clamping position and a release position. The first clamping member includes a first opening for receiving a second end of the locking rod body therethrough. The second clamping member is adapted to align with the first clamping member to receive the item therebetween. The retainer is connected to the second clamping member and includes a second opening for receiving the second end of the locking rod body and an interlocking feature for engaging a corresponding interlocking feature on the locking rod body when the locking rod body is in a first rotational position. When the item is positioned between the first and second clamping members and the locking rod is inserted through the first opening and into the second opening and oriented in the first rotational position, moving the locking member from the release position to the clamping position tightens the first and second clamping members into clamping engagement with the item.

23 Claims, 4 Drawing Sheets

U.S. PATENT DOCUMENTS

| | | | | |
|---|---|---|---|---|
| 5,792,046 A | * | 8/1998 | Dobrovolny | 403/374.1 |
| 6,033,363 A | * | 3/2000 | Farley et al. | 600/234 |
| 6,234,372 B1 | * | 5/2001 | Rivera | 224/536 |
| 6,623,025 B2 | * | 9/2003 | McCoy et al. | 224/519 |
| 6,736,301 B1 | * | 5/2004 | Huang | 224/536 |

* cited by examiner

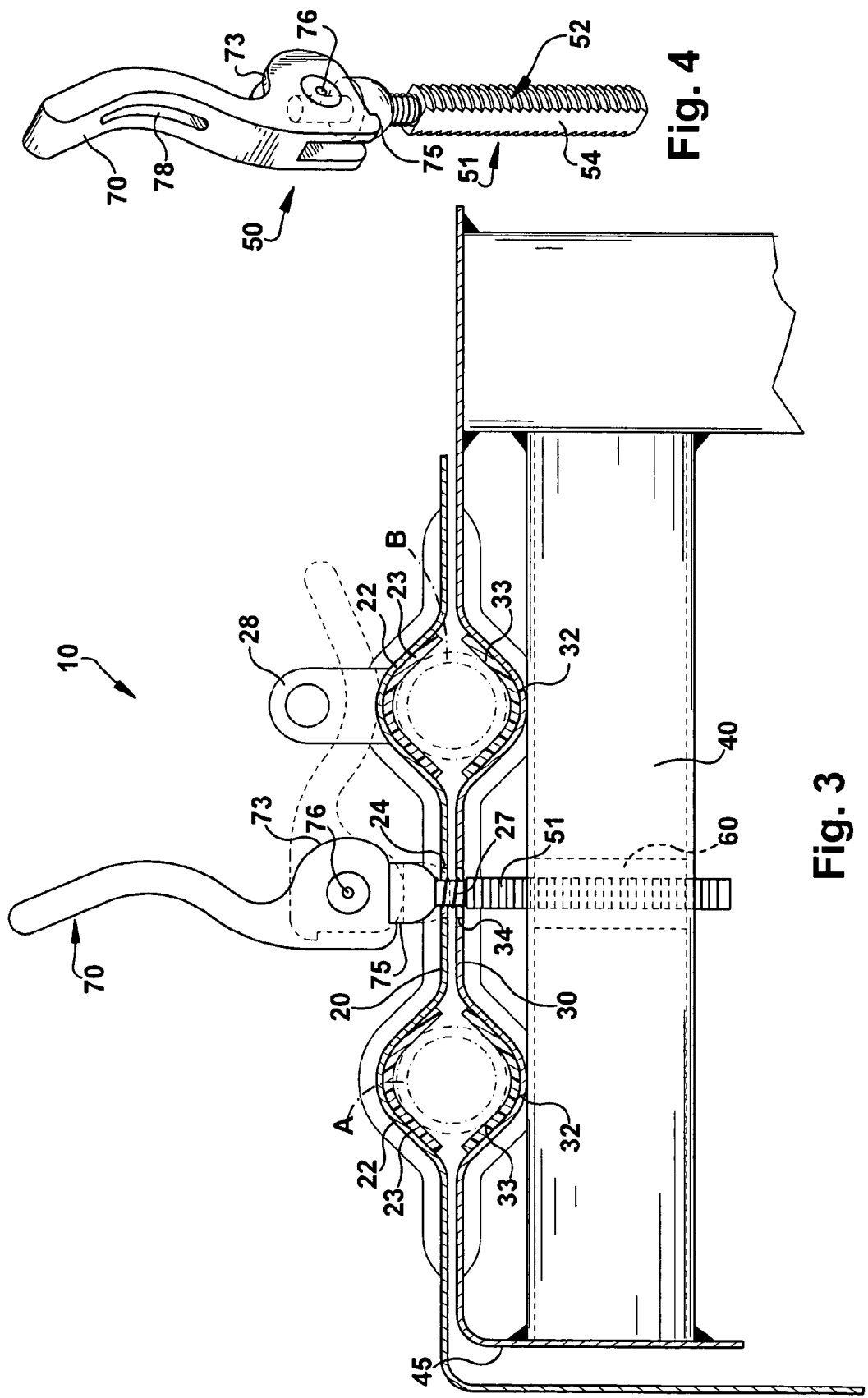

CLAMP

CROSS REFERENCE TO RELATED APPLICATIONS

This application claims the benefit of U.S. Provisional Patent Application No. 60/691,922, filed Jun. 17, 2005, the entire disclosure of which is hereby incorporated by reference.

FIELD OF THE INVENTION

The present application relates to a clamp and more specifically to a clamp featuring quick clamping and releasing features for use in securing an item.

BACKGROUND OF THE INVENTION

Conventional cable locks and U-bar locks are often used to secure an item, such as, for example, a bicycle, to a structure, such as a bicycle rack or sign post. While these or other locks may be sufficient to secure an item to a stationary structure, such a locking arrangement is often inadequate when securing the item to a vehicle, as movement of an item loosely attached to a moving vehicle may cause damage to the item and cause safety hazards to the driver and to others.

Racks have been provided for mounting on cars, trucks and buses, to provide a means for securing an assortment of items, such as bicycles, surfboards, skis, and luggage or other cargo to the vehicle. Such racks are often provided with clamps or locks to rigidly secure the item or items to the rack.

One such rack 1 is illustrated in FIG. 1. The rack 1 includes a pair of opposed plates 2, 3 provided with aligned saddles 2b, 3b, respectively, for receiving the crossbars A, B of one or more bicycles. To secure a bicycle to the rack 1, a threaded bolt 5 is inserted through aligned holes 2b, 3b in the plates and threaded into a threaded hole (not shown) in a frame member 4. The frame member 4 may be mounted to a stationary structure, such as a wall or ground surface, or to a vehicle. By tightening the bolt 5 into the frame member 4, the plates 2, 3 are drawn into clamping engagement with the bicycle crossbars A, B to rigidly secure the bicycle to the frame member 4. However, the process of tightening or loosening the rack I may be time consuming and/or strenuous, as numerous rotations of the bolt 5 may be necessary to tightly clamp the crossbars A, B. Also, the tightened bolt 5 may be susceptible to loosening as a result of vibrations experienced when the vehicle is driven. Further, when clamping an item on only one side of the rack 1, the plates 2, 3 may skew, resulting in an uneven clamping force or difficulty in tightening the rack 1. Still further, the clamping rack 1 illustrated in FIG. 1 does not offer a lockout feature, thus presenting a risk of theft.

SUMMARY OF THE INVENTION

The present application relates to a clamp for securing an item to a structure. According to one aspect of the application, a clamp may be adapted to provide a quick clamping mechanism that does not require multiple rotations of a bolt or other fastener to securely clamp the item. According to another aspect of the application, a clamp may be adapted to provide a uniform clamp load to an item secured between two plates when the plates are skewed at an angle with respect to each other. According to yet another aspect of the application, a clamp may be adapted to be locked in the clamped condition, thus preventing accidental loosening of the clamp or theft of the secured item.

In one exemplary embodiment, a clamp for securing an item includes a locking rod, first and second clamping members, and a retainer. The locking rod includes an elongated body and a locking member connected to a first end of the elongated body. The locking member is movable between a clamping position and a release position. The first clamping member includes an opening for receiving a second end of the locking rod body therethrough. The second clamping member is adapted to be aligned with the first clamping member to receive the item therebetween. The retainer is connected to the second clamping member and includes a second opening for receiving the second end of the locking rod body. The retainer also includes an interlocking feature for engaging a corresponding interlocking feature on the locking rod body when the locking rod body is in a first rotational position. When the item is positioned between the saddles of the first and second clamping members and the locking rod is inserted through the first opening and into the second opening and oriented in the first rotational position, moving the locking member from the release position to the clamping position tightens the first and second plates into clamping engagement with the item.

BRIEF DESCRIPTION OF THE DRAWINGS

Further features and advantages of the invention will become apparent from the following detailed description made with reference to the accompanying drawings, wherein:

FIG. 3 is a side cross-sectional view of the clamping arrangement of FIG. 2.

FIG. 4 is a perspective view of the locking rod of the clamping arrangement of FIG. 2;

DESCRIPTION OF THE INVENTION

Figure 1:
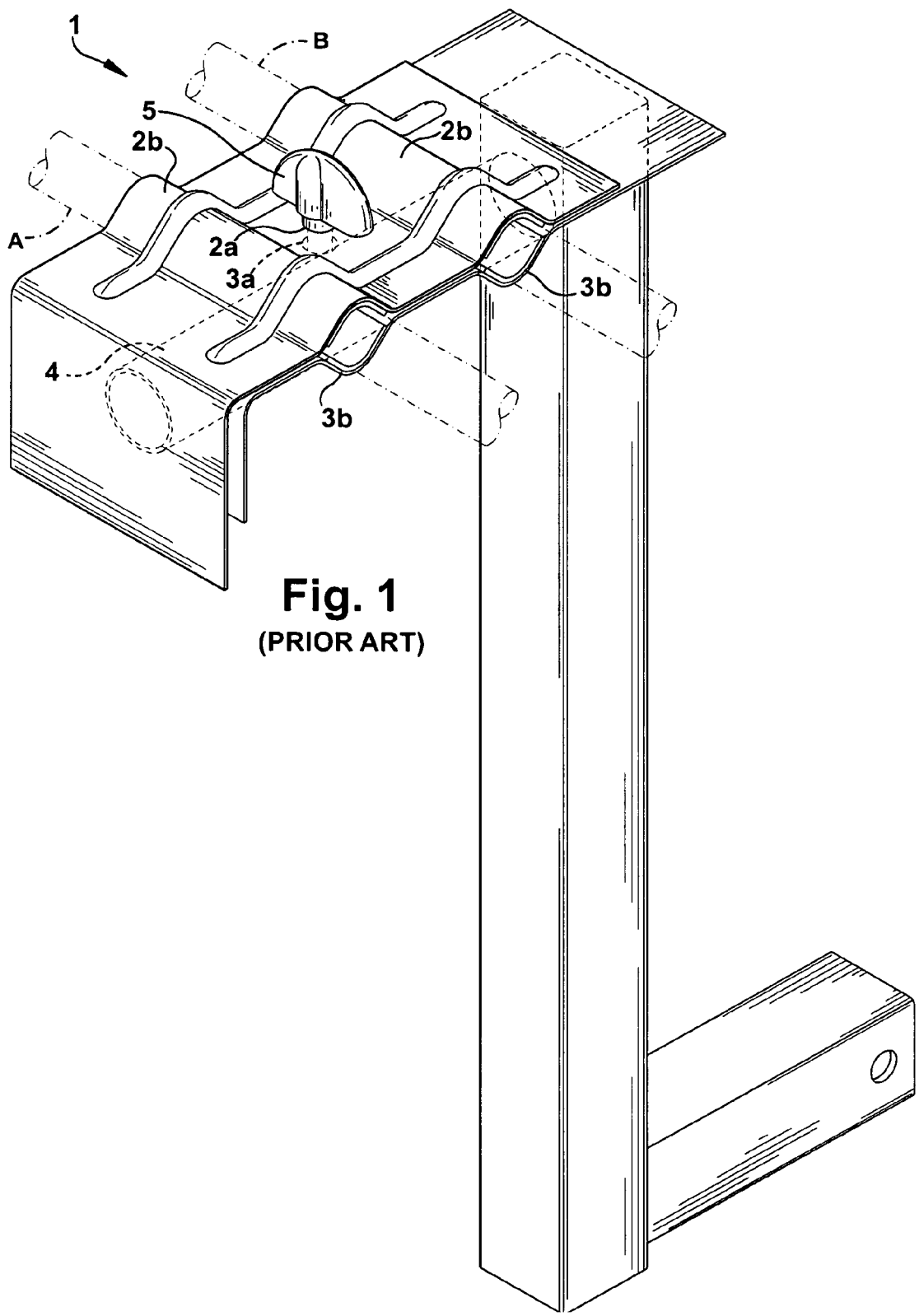
FIG. 1 is a perspective view of a bike rack known in the prior art with a threaded bolt clamping arrangement.

This Detailed Description of the Invention merely describes embodiments of the invention and is not intended to limit the scope of the claims in any way. Indeed, the invention as described is broader than and not limited by the preferred embodiments, and the terms used have their full ordinary meaning.

FIGS. 2-6 illustrate a clamp or clamping arrangement 10 according to an exemplary embodiment of the invention, adapted for use in securing one or more bicycles to a truck or automobile. It should be understood that features of the present invention may be applied to securing a wide variety of items to many types of stationary or vehicle mounted racks or structures.

In one embodiment, a clamping arrangement may include first and second clamping members between which one or more items may be clamped. The clamping members may take many different forms or configurations to accommodate the item or items to be clamped. In the illustrated embodiment of FIGS. 2 and 3, the clamping members include first and second plates having opposed saddles 22, 32 shaped to receive the crossbars A, B of one or more bicycles therebetween. The saddles 22, 32 may be provided with padded portions 23, 33 to prevent marring of the clamped items. While the illustrated embodiment includes two saddles 22, 32 on each plate 20, 30, for securing up to two bicycles, it should be noted that the clamping members may be provided with any number of saddles, corrugations, cut-outs or other such locations for receiving any number of many different types of items.

The plates 20, 30 may be connectable to a frame, such as a rack or trailer mount, for attachment to a structure, such as a wall or vehicle. In the illustrated embodiment of FIGS. 2 and 3, the second plate 30 is affixed to a frame member 40, which may be directly mountable to the receiver of a trailer hitch on a vehicle (not shown), such as a truck or sport utility vehicle. The second plate 30 may be affixed directly to the frame member 40 and/or by a bracket portion 45 that is welded or affixed with fasteners (or by any other appropriate means) to the plate 30 and frame member 40.

According to the present invention, a locking rod may be insertable through aligned openings in first and second clamping members to apply a clamping force to the clamping members. In one embodiment, a portion of the locking rod may engage a retainer connected with the second clamping member, such that movement of the locking rod within the aligned openings exerts a clamping force on the second clamping member, to bring the first and second clamping members into clamping engagement with one or more items placed between them. The retainer may be any type of structure, such as a bracket, fastener, latch, or other such housing adapted to secure an inserted end of the locking rod. The retainer may be connected directly or indirectly to the second clamping member. In one example, the retainer includes a housing provided in a frame member connected to the second clamping member. Many different mechanisms may be used to engage the locking rod with the retainer. In one embodiment, the locking rod and retainer are provided with interlocking features, such as, for example, detents or mating threads, such that the locking rod engages the retainer to provide a secure connection.

Figure 5:
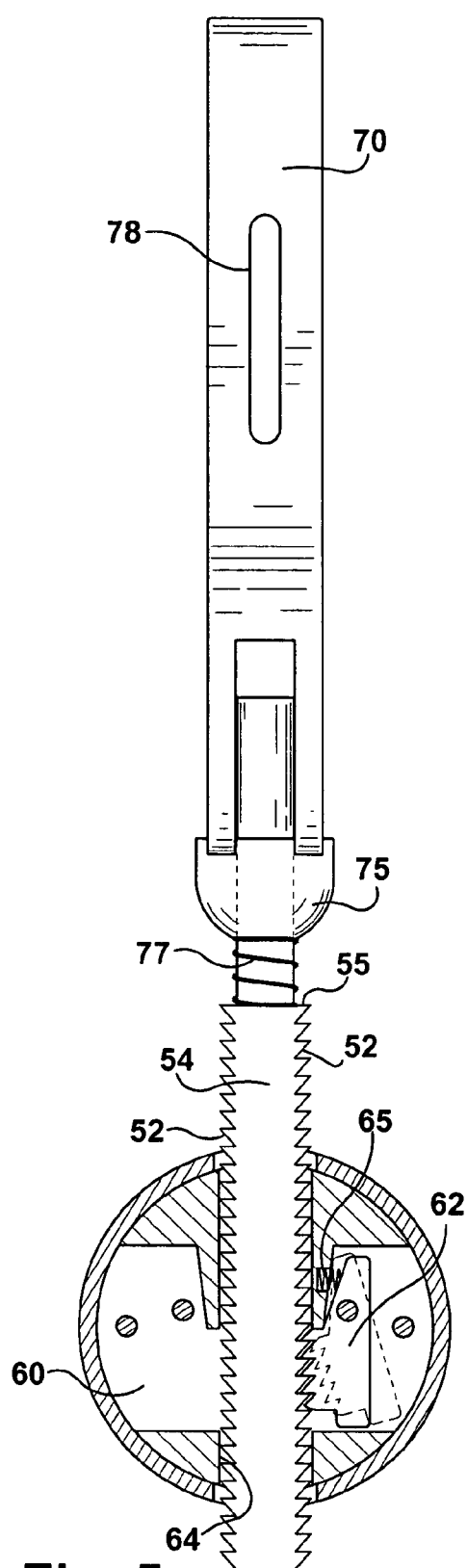
FIG. 5 is side view of the locking rod and retainer of the clamping arrangement of FIG. 2, with the locking rod in an engaged condition.
Figure 6:
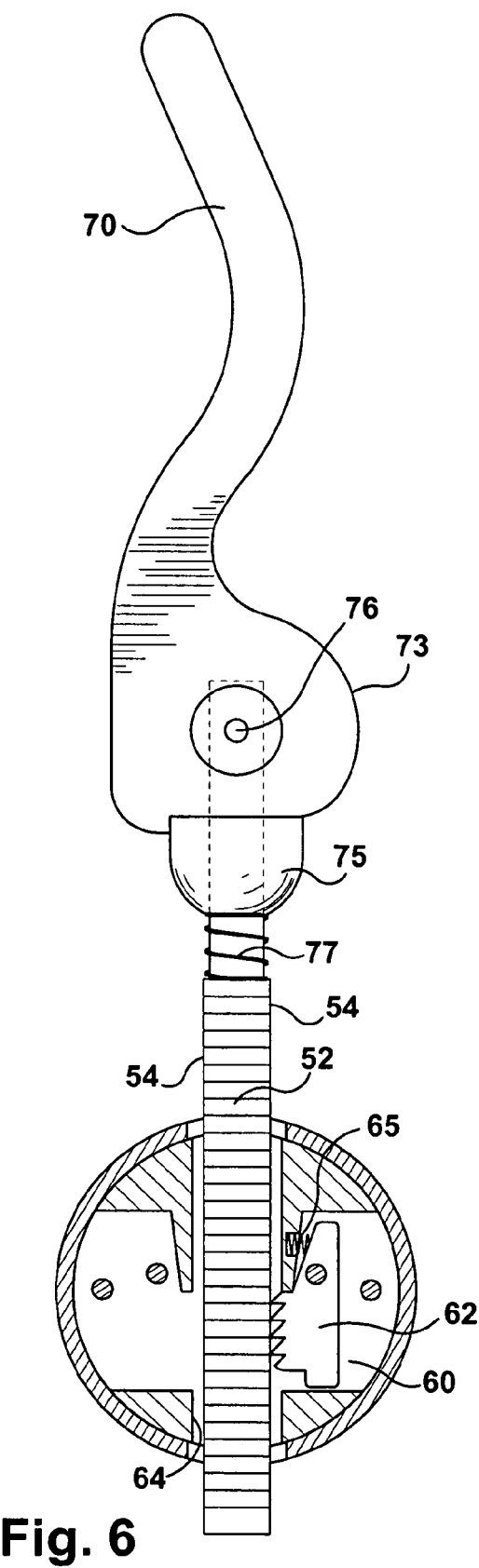
FIG. 6 is a side view of the locking rod and retainer of FIG. 5, with the locking rod in a disengaged condition.

While the locking rod may take many different forms, in the illustrated embodiment best shown in FIG. 4, a locking rod 50 may be provided with an elongated body 51 having one or more threaded or toothed portions 52 and one or more flat portions 54. The first and second plates 20, 30 are provided with aligned openings 24, 34 for receiving the locking rod 50. A housing or retainer 60 is provided in the frame member 40 in alignment with the openings 24, 34. A retainer opening 64 is positioned to receive an inserted end of the locking rod body 51 into the retainer 60. As shown in FIGS. 5 and 6, the retainer 60 includes a toothed or threaded pawl 62 disposed in the bore 64 for engagement with the threaded portions 52 of the locking rod body 51 (see FIG. 5). The threaded pawl 62 may be biased into engagement with the locking rod body 51 by a spring 65. This allows the threaded portion 52 to slide past the pawl 62 in a clamping direction during insertion of the locking rod 50, as shown in phantom in FIG. 5, as insertion of the locking rod forces the pawl 62 outward against the spring 65. Withdrawal of the locking rod 50 in a releasing direction is prevented when the threaded portion 52 is engaged with the pawl. To disengage the locking rod body 51 from the retainer 60, the locking rod body 51 may be rotated to align a flat portion 54 of the locking rod body 51 with the pawl 62 (see FIG. 6), thereby disengaging the threaded portion 52 and allowing the locking rod 50 to be withdrawn. The illustrated locking rod body is provided with two threaded portions 52 and two flat portions 54, all approximately the same size, which allows for no more than quarter-turn (90°) rotation of the locking rod body 51 to disengage the locking rod 50 from the retainer 60.

When an inserted end of a locking rod has engaged a retainer connected to the second clamping member, a locking member may be provided with the locking rod to engage the first clamping member and hold the clamping members in clamping engagement with the clamped items. The locking member may include many different types of mechanisms and components, including, for example, pins, latches, and fasteners. In one embodiment, a locking member includes a lever pivotally connected to the locking rod, such that the lever is pivotable into a clamping condition, in which the lever pulls the inserted end of the locking rod and the retainer toward the first clamping member, while pressing the first clamping member against the second clamping member. This locking member may be a removable component that attaches to the rod to provide engagement. The locking member may also be permanently attached to the rod and movable between an engaging or clamping position and a disengaging or release position.

In the illustrated embodiment, the locking rod 50 is provided with a locking member or locking lever 70 pivotally connected to an end of the locking rod body 51, such that the lever 70 pivots about an axis perpendicular to the locking rod body 51. While the illustrated lever 70 is connected to the locking rod body by a pivot pin 76, mechanisms may be provided to connect the lever to the locking rod body. The exemplary locking lever 70 is provided with a camming surface 73 adapted to exert a force against the first plate 20 when the lever 70 is pivoted from a release position to a clamping position. While the lever 70 of the illustrated embodiment is substantially collinear with the locking rod body 51 in the release position and perpendicular to the locking rod body 51 in the clamping position, the lever may be adapted to provide clamping and release positions at different orientations. While a lever may be provided with a camming surface that directly engages the first plate, the illustrated embodiment includes a cup-shaped seating adapter 75 disposed on the locking rod body 51 between the lever 70 and a shoulder 55. The first plate opening 24 may be provided with a contoured surface for flush engagement between a contoured surface of the seating adapter 75 and the opening 24. When the exemplary lever 70 is pivoted into the clamping position, engagement of the camming surface 73 with the cup-shaped adapter 75 (shown in phantom in FIG. 3) presses the adapter 75 against the first plate opening 24 while pulling the retainer 60, frame member 40, and second plate 30 toward the first plate 20, to clamp an item or items placed between the saddles 22, 32. The mating contoured surfaces of the opening 24 and the seating adapter 75, which may be spherical surfaces, may provide a uniform clamping force to the first plate 20, even when the first and second plates 20, 30 are skewed at an angle with respect to each other. This skewed condition may occur when only one item is being secured by the clamp 10, creating a gap between only one pair of saddles 22, 32, or when different sized items are being secured in the clamp, creating different sized gaps in the different pairs of saddles 22, 32. A spring 77 may also be provided between the seating adapter 75 and the shoulder 55, to assist in separating the mating contoured surfaces of the adapter 75 and the opening 24 when the clamp is released.

Figure 2:
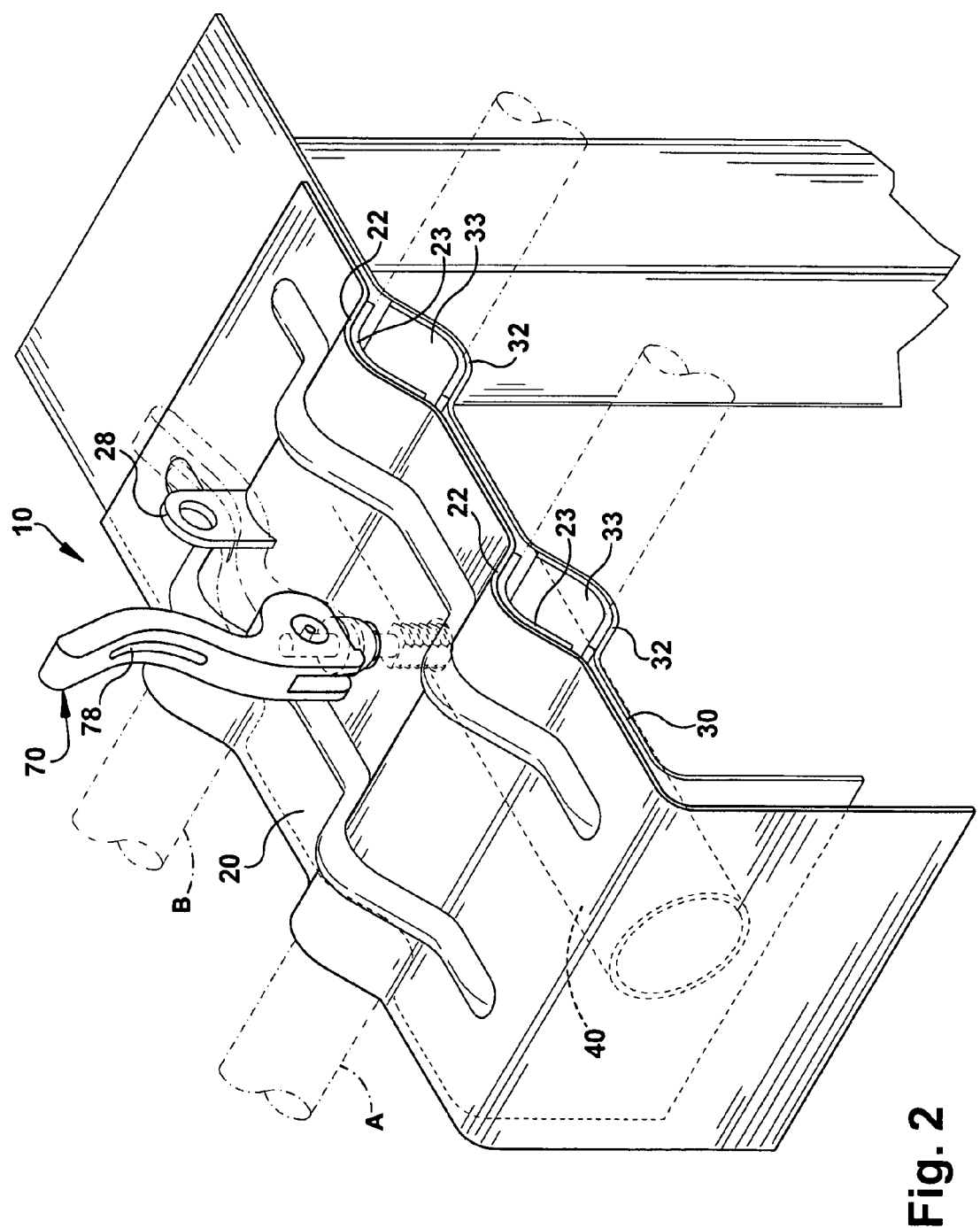
FIG. 2 is a perspective view of a clamping arrangement.

According to another aspect of the invention, a locking lever that draws first and second clamping members into clamping engagement with an item or items may be adapted to be locked in a clamping position. This may prevent loosening of the clamp and/or theft of the clamped item or items. Many different locking arrangements or mechanisms may be provided. In the illustrated embodiment, as shown in FIGS. 2 and 3, the first plate 20 is provided with a hasp 28 positioned to be received through a slot or other such aperture 78 in the locking lever 70 when the lever 70 is pivoted into the clamping position. By inserting a padlock, cable, or other obstruction through the hasp 28, the pivoted lever 70 may be prevented from pivoting to the release position until the obstruction is removed. This may prevent the locking rod 50 from being withdrawn from the retainer 70 and plates 20, 30. This may also prevent the threaded portion 52 of the locking rod body 51 from being rotated out of engagement with the pawl 62, thereby maintaining a secure clamping condition.

In operating the illustrated exemplary clamping arrangement, the frame member 40 is attached to a vehicle or other structure (not shown). The crossbars A, B of the bicycles to be clamped are placed between saddles 22, 32 of the first and second plates 20, 30. The locking rod body 51 is inserted through openings 24, 34 in the first and second plates 20, 30, and into the retainer opening 64. The locking rod body 51 is rotationally positioned such that a threaded portion 52 on the locking rod body 51 engages the threaded pawl 62 to secure the inserted end of the locking rod body 51 in the retainer 60. The locking lever 70 is then pivoted into a clamping position causing the camming surface 73 to engage the seating adapter 75, pushing the first plate 20 toward the inserted end of the locking rod body 51, as well as the retainer 60 and second plate 30, to draw the first and second plates 20, 30 into clamping engagement with the crossbars A, B. The hasp 28 is received through the slot 78 in the pivoted lever 70. A padlock, cable, or other obstruction (not shown) is inserted through the hasp 28 to retain the pivoted clamping position of the lever 70, and the rotational position of the locking rod body 51 to maintain engagement between the threaded portion 52 and the pawl 62.

To remove the bicycles from the exemplary clamping arrangement, the obstruction is removed from the hasp 28, and the lever 70 is pivoted to the release position, which allows the first plate 20 to move away from the second plate 30 to loosen the clamped condition. The locking rod body 51 is then rotated to align a flat portion 54 of the body 51 with the pawl 62, which is generally less than a quarter-turn (90°) rotation. This allows the locking rod body 51 to be disengaged from the pawl 62. The locking rod body 51 is then withdrawn from the retainer 60 and from the first and second plates 20, 30. The first plate 20 is then separated from the second plate 30 so that the items may be removed.

While several embodiments of the invention has been illustrated and described in considerable detail, the present invention is not to be considered limited to the precise constructions disclosed. Various adaptations, modifications and uses of the invention may occur to those skilled in the arts to which the invention relates. It is the intention to cover all such adaptations, modifications and uses falling within the scope or spirit of the claims filed herewith.

We claim:

1. A clamp for holding an item, the clamp comprising:
   a locking rod comprising a locking rod body and a locking member connected to a first end of the locking rod body, the locking member being pivotable about an axis perpendicular to the locking rod body between a clamping position and a release position;
   a first clamping member comprising a first opening for receiving a second end of the locking rod body therethrough;
   a second clamping member adapted to align with the first clamping member to receive the item therebetween; and
   a retainer connected to the second clamping member, the retainer comprising a second opening for receiving the second end of the locking rod body and an interlocking feature for engaging a corresponding interlocking feature on the locking rod body when the locking rod body is in a first rotational position;
   wherein when the item is positioned between the first and second clamping members and the locking rod body is inserted through the first opening and into the second opening and the locking rod body is oriented in the first rotational position, pivoting the locking member from the release position to the clamping position tightens the first and second clamping members into clamping engagement with the item, and
   when the locking rod body is in a second rotational position in the retainer, the interlocking features of the locking rod body and retainer are disengaged to allow the locking rod body to be withdrawn from the retainer;
   further wherein the locking member comprises a lever pivotally connected to the first end of the locking rod body, the lever being pivotable between the clamping position and the release position, and the first clamping member further comprises a hasp, wherein when the lever is in the clamping position and the locking rod body is in the first rotational position, insertion of an obstruction through the hasp secures the lever in the clamping position and secures the locking rod body in the first rotational position.

2. The clamp of claim 1, wherein the first rotational position is approximately ninety degrees from the second rotational position.

3. The clamp of claim 1, wherein the lever comprises an aperture for receiving the hasp therethrough.

4. The clamp of claim 1, wherein the locking rod further comprises a seating adapter assembled with the first end of the elongated body for seating against the first opening, wherein a camming surface of the lever engages the seating adapter to position the locking rod body with respect to the seating adapter.

5. The clamp of claim 4, wherein the seating adapter and the first opening comprise complementary contoured surfaces.

6. The clamp of claim 5, wherein the complementary contoured surfaces are spherical surfaces.

7. The clamp of claim 4, wherein the seating adapter is retained on the locking rod body between the lever and a shoulder at the first end of the locking rod body.

8. The clamp of claim 7, further comprising a spring disposed on the locking rod body between the seating adapter and the shoulder.

9. The clamp of claim 1, wherein the locking rod body interlocking feature comprises a threaded surface and the retainer interlocking feature comprises a threaded pawl.

10. The claim of claim 9, wherein the threaded surface and the threaded pawl comprise zero pitch threads.

11. The clamp of claim 9, wherein the threaded pawl is spring-loaded, such that when the locking rod body is in the first orientation, the pawl permits movement of the locking rod body in a clamping direction and prevents movement of the locking rod body in a releasing direction.

12. The clamp of claim 9, wherein the locking rod body further comprises a flat surface that aligns with the threaded pawl in the second rotational position.

13. The clamp of claim 1, wherein the first and second clamping members comprise first and second plates.

14. The clamp of claim 13, wherein the first and second plates each comprise a saddle for receiving the item therebetween.

15. The clamp of claim 14, wherein the first and second plates each comprise a plurality of saddles for receiving a plurality of items therebetween.

16. The clamp of claim 1, wherein the retainer is disposed in a frame member.

17. The clamp of claim 16, wherein the frame member is adapted to be mounted to a vehicle.

18. A clamp for holding an item, the clamp comprising:
a locking rod comprising an elongated body and a lever pivotally connected to a first end of the elongated body, the lever being pivotable between a clamping position and a release position;
a first clamping member comprising a first opening for receiving a second end of the locking rod body therethrough;
a second clamping member adapted to align with the first clamping member to receive the item therebetween; and
a retainer connected to the second clamping member, the retainer comprising a second opening for receiving the second end of the locking rod body and threaded pawl for engaging a corresponding threaded surface on the locking rod body when the locking rod body is in a first rotational position;
wherein the locking rod further comprises a seating adapter assembled with the first end of the elongated body for seating against the first opening, wherein a camming surface of the lever engages the seating adapter to position the locking rod body with respect to the seating adapter.

19. The clamp of claim 18, wherein the locking rod body further comprises a flat portion that aligns with the threaded pawl when the locking rod body is in a second rotational position.

20. A clamp for holding an item, the clamp comprising:
a locking rod comprising an elongated body and a locking member connected to a first end of the elongated body, the locking member being movable between a clamping position and a release position;
a first clamping member comprising a first opening for receiving a second end of the locking rod body therethrough;
a second clamping member adapted to align with the first clamping member to receive the item therebetween; and
a retainer connected to the second clamping member, the retainer comprising a second opening for receiving the second end of the locking rod body and an interlocking feature for engaging a corresponding interlocking feature on the locking rod body when the locking rod body is in a first rotational position;
wherein when the item is positioned between the first and second clamping members and the locking rod body is inserted through the first opening and into the second opening and the locking rod body is oriented in the first rotational position, moving the locking member from the release position to the clamping position tightens the first and second clamping members into clamping engagement with the item, and when the locking rod body is in a second rotational position in the retainer, the interlocking features of the locking rod body and retainer are disengaged to allow the locking rod body to be withdrawn from the retainer; and
further wherein the locking rod body interlocking feature comprises a threaded surface and the retainer interlocking feature comprises a threaded pawl.

21. The clamp of claim 20, wherein the threaded surface and the threaded pawl comprise zero pitch threads.

22. The clamp of claim 20, wherein the threaded pawl is spring-loaded, such that when the locking rod body is in the first orientation, the pawl permits movement of the locking rod body in a clamping direction and prevents movement of the locking rod body in a releasing direction.

23. The clamp of claim 20, wherein the locking rod body further comprises a flat surface that aligns with the threaded pawl in the second rotational position.

* * * * *